(12) United States Patent  
Makar et al.

(10) Patent No.: US 8,738,739 B2
(45) Date of Patent: May 27, 2014

(54) AUTOMATIC MESSAGE SELECTION WITH A CHATBOT

(75) Inventors: Michael G. Makar, Boca Raton, FL (US); Tracy A. Tindall, Boca Raton, FL (US)

(73) Assignee: The Delfin Project, Inc., Boca Raton, FL (US)

( * ) Notice: Subject to any disclaimer, the term of this patent is extended or adjusted under 35 U.S.C. 154(b) by 299 days.

(21) Appl. No.: 13/277,420

(22) Filed: Oct. 20, 2011

(65) Prior Publication Data

US 2012/0095835 A1   Apr. 19, 2012

Related U.S. Application Data

(63) Continuation-in-part of application No. 13/084,060, filed on Apr. 11, 2011, which is a continuation-in-part of application No. 12/124,531, filed on May 21, 2008, now Pat. No. 7,962,578.

(51) Int. Cl.
*G06F 15/16* (2006.01)

(52) U.S. Cl.
USPC ............ 709/219; 709/202; 709/203; 709/225

(58) Field of Classification Search
CPC ....... H04L 51/04; G06Q 30/02; G06Q 20/085
USPC ......................................... 709/219, 202, 203
See application file for complete search history.

(56) References Cited

U.S. PATENT DOCUMENTS

| | | | |
|---|---|---|---|
| 6,032,129 A | 2/2000 | Greef et al. | |
| 6,349,290 B1 | 2/2002 | Horowitz et al. | |
| 6,604,141 B1 | 8/2003 | Ventura | |
| 6,606,744 B1 | 8/2003 | Mikurak | |
| 7,039,599 B2 | 5/2006 | Merriman et al. | |
| 7,170,993 B2 | 1/2007 | Anderson et al. | |
| 7,552,365 B1 | 6/2009 | Marsh et al. | |
| 7,689,432 B2 | 3/2010 | Gross | |
| 7,739,329 B2 | 6/2010 | Thompson | |
| 7,814,041 B2 | 10/2010 | Caporale et al. | |
| 8,086,462 B1 | 12/2011 | Alonso et al. | |
| 2001/0042023 A1 | 11/2001 | Anderson et al. | |
| 2002/0005865 A1 | 1/2002 | Hayes-Roth | |
| 2002/0073208 A1 | 6/2002 | Wilcock et al. | |
| 2002/0133347 A1 | 9/2002 | Schoneburg et al. | |
| 2003/0154120 A1 | 8/2003 | Freishtat et al. | |

(Continued)

OTHER PUBLICATIONS

Sloan, Paul. "That online chat 'assistant' may not be real." CNN Money, Dec. 17, 2007. Retrieved from http://money.cnn.com/2007/12/14/technology/sloan_upsellit.fortune/.*

(Continued)

*Primary Examiner* — Nicholas Taylor

(74) *Attorney, Agent, or Firm* — Fleit Gibbons Gutman Bongini & Bianco, PL; Jon A. Gibbons

(57) ABSTRACT

Disclosed is a novel system and process to use information gathered by a chatbot system including explanations why a potential customer is discontinuing a transaction. The transaction in one example is a sales transaction. This information is associated with the potential customer. Using this information, the present invention enhances the message targeting by advertisers and remarketing system for the identified potential customer. The advertisers and remarketing systems use the information from the chatbot system to automatically select messaging and advertisements.

20 Claims, 10 Drawing Sheets

(56) References Cited

U.S. PATENT DOCUMENTS

| | | |
|---|---|---|
| 2003/0167195 A1 | 9/2003 | Fernandes et al. |
| 2003/0182391 A1 | 9/2003 | Leber et al. |
| 2003/0195811 A1 | 10/2003 | Hayes, Jr. et al. |
| 2004/0153357 A1 | 8/2004 | De Sylva |
| 2006/0026071 A1* | 2/2006 | Radwin .......................... 705/14 |
| 2006/0036430 A1 | 2/2006 | Hu |
| 2006/0069546 A1 | 3/2006 | Rosser et al. |
| 2006/0080130 A1 | 4/2006 | Choksi |
| 2006/0122917 A1 | 6/2006 | Lokuge et al. |
| 2006/0150119 A1 | 7/2006 | Chesnais et al. |
| 2007/0198368 A1 | 8/2007 | Kannan et al. |
| 2007/0203693 A1 | 8/2007 | Estes |
| 2008/0215995 A1* | 9/2008 | Wolf .......................... 715/758 |
| 2008/0221892 A1 | 9/2008 | Nathan et al. |
| 2008/0288349 A1* | 11/2008 | Weisberg et al. ............... 705/14 |
| 2009/0100160 A1 | 4/2009 | Bowerman |
| 2009/0216691 A1* | 8/2009 | Borzestowski et al. ......... 706/11 |
| 2009/0245500 A1 | 10/2009 | Wampler |
| 2009/0248399 A1 | 10/2009 | Au |
| 2009/0254417 A1 | 10/2009 | Beilby et al. |
| 2009/0254836 A1 | 10/2009 | Bajrach |
| 2009/0276704 A1 | 11/2009 | Finn et al. |
| 2009/0292778 A1 | 11/2009 | Makar et al. |
| 2011/0055309 A1 | 3/2011 | Gibor et al. |
| 2013/0167004 A1 | 6/2013 | Goldman |

OTHER PUBLICATIONS

Morphy, Erika. "The Brave New Mashed-Up World of Online Sales." CRM Buyer, Jan. 31, 2008. Retrieved from http://www.crmbuyer.com/story/61466.html.*

Smart Solutions, Better Conversation. www.upsellit.com/solutions.jsp. May 5, 2010.

Intellichat Automated Virtual Sales Agent: Increase Conversions. www.intellichat.com. May 5, 2010. p. 1-2.

Internet Archive. www.archive.org for www.upsellit.com. May 11, 2010.

Internet Archive. www.archive.org for www.intellichat.com. May 11, 2010.

Internet Archive. www.archive.org for www.intellichat.com for May 26, 2007. Search May 11, 2010.

Final Office Action dated Jun. 20, 2013 received for U.S. Appl. No. 13/084,060.

Non-Final Office Action dated Jan. 24, 2013 received for U.S. Appl. No. 13/084,060.

Advisory Action dated Sep. 13, 2013 received for U.S. Appl. No. 13/084,060.

* cited by examiner

| AFFILIATE WEBSITE ID | REASON FOR DISCONTINUING A TRANSACTION | ITEM(S) | END USER ID | DATE | TIME | URL |
|---|---|---|---|---|---|---|
| WEBSITE B | SELECTION | WOMEN'S SHOES | 57196450 | 5/1/2011 | 11:34AM | |
| WEBSITE A | SHIPPING COSTS | MODEL XYZ HD TV | 15730567 | 5/4/2011 | 6:40PM | |
| WEBSITE C | FINANCING | HOUSE PAINTING | 64429861 | 5/11/2011 | 2:52pm | |
| ... | ... | ... | ... | ... | ... | ... |

CHAT SERVER RECORD

FIG. 8

AUTOMATIC MESSAGE SELECTION WITH A CHATBOT

CROSS-REFERENCE TO RELATED APPLICATIONS

This application is a continuation-in-part of and claims priority from prior U.S. patent application Ser. No. 12/124,531, filed on May 21, 2008, now U.S. Pat. No. 7,962,578, the disclosure of each application is incorporated by reference in its entirety.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

FIELD OF THE INVENTION

This present invention generally relates to the field of internet based marketing and advertising, and more specifically to targeted advertisement, targeted messaging, and improved chatbots.

BACKGROUND OF THE INVENTION

Consumers, also known as users or end-users, continue to demand and expect high quality, highly personalized interactions with internet based products services. Simultaneously, website publishers constantly look for opportunities to reduce the rate at which users abandon their web sites prior to completing registration, completing a lead form or abandoning a shopping cart before final checkout. There are many reasons why users abandon websites. One reason is users are often distracted or confused when interacting with websites. Distractions can be caused by interruptions or simply by rushing or simply a change in expectation, i.e. registration to the website is required. For example, social networking sites typically require registration. Many times a user will often become bashful or unwilling to share information. Although the term "website publishers" and "web retailers" are used throughout this application, it is important to note that the term Lead generation (commonly abbreviated as lead-gen) is a marketing term that refers to the creation or generation of prospective consumer interest or inquiry into a business's products or services. Often, lead generation is associated with marketing activity targeted at generating sales opportunities for a company's sales force. Lead generation often uses a lead form such as a questionnaire for insurance, mortgage, loan, credit card, pre-paid card and the like. A lead is therefore correctly described as information regarding or provided by a consumer that may be interested in making a purchase; whereas, generation is one of a myriad of activities that may produce that information and perceived interest.

SUMMARY OF THE INVENTION

The present invention, also known as TeamSalesAgent™ (TSA), is the solution for e-commerce, lead generation and co-registration websites and web-enabled applets presenting web pages interested in increasing sales, dramatically improving their level of customer service and decreasing the company's overhead costs of using "live" sales agents. This unique chat technology fuses self-learning, artificial intelligence with the popularity and ease of online messaging. TeamSalesAgent works 24/7/365 to deliver increased conversions and decreased abandonment.

TeamSalesAgent Benefits include:
Make web retailer's site interactive.
Adds social interaction to social networking sites.
Increase web retailer's registrations/memberships.
Increase web retailer's sales.
Increase web retailer's conversation rates.
Drastically decrease web retailer's shopping cart abandonment.
Make web retailer's site interactive.
Up-Sell & Cross-Sell additional products.
No turnaround time for customers-immediate service
Easy integration.
Real time success and failure analysis to new products and sales efforts.

The present invention is uniquely designed to interact with web retailer's customers with real agent reaction times as they give astute answers directly concerning web retailer's products and goals or offer incentives to complete an action. The patented artificial intelligence engine uses the combination of Bayesian probability and statistics keyword selection, natural language parsing and regular expression processing. Every client interaction is recorded and analyzed, and as a result of the analysis, changes in the answer database are made.

More specifically, the present invention provides a method to present a browser-based chat and messaging window ("chat window") made to look like an instant message window from a live person as an exit pop when a user exits a web site. In another example, the present invention launches a chat window during a session, such as after a settable period of time, or after settable period of user inactivity or a combination of both. Many times, a user will abruptly terminate a shopping cart, registration or lead abandonment at a website. In one example, the method includes presenting at least one messaging window after the end-user terminates a web session. Next a message is displayed to the end-user through the messaging window. The response from the end-user is reviewed using a combination of scripting and artificial intelligence. In this example the scripting, the messaging window and the artificial intelligence are all managed via a web site.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

FIG. 8 is a data record populated by the chat server with information including reason for discontinuing a transaction;

DESCRIPTION OF THE PREFERRED EMBODIMENTS

Figure 1:
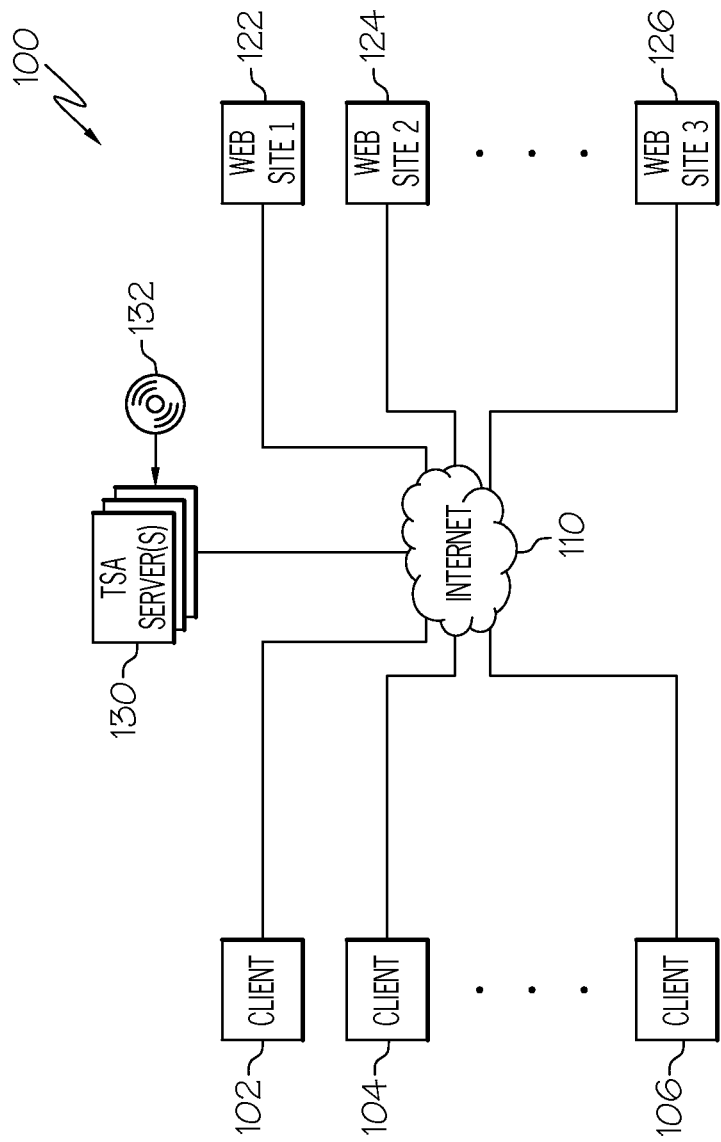
FIG. 1 is a diagram of the overall system for managing deployment and reporting behavior of chatbots, according to the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as at least one or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "program", "software application", and the like as used herein, are defined as a sequence of instructions designed for execution on an information processing circuit. A program, computer program, or software application may include a subroutine, a function, a procedure, an object method, an object implementation, an executable application, an applet, a servlet, a source code, an object code, a shared library/dynamic load library and/or other sequence of instructions designed for execution on an information processing circuit. Further, the terms "present invention" and "Team Sales Agent" or "TSA" or "application" and "applet" are used interchangeably herein.

The term "chatbot" also known as "chatter robot", "chatterbot", "virtual agent", virtual sales agent", "artificial intelligence agent" or "chat bot" is a computer program designed to simulate an intelligent conversation with one or more human users via auditory or textual methods, primarily for engaging in small talk. An aim of such simulation has been to fool the end-user into thinking that the program's output has been produced by a human.

Prior to the present invention, publishers and/or retailers had to primarily rely on exit pops and follow-up emails to attempt to recover lost customers or cross-sell or up-sell them. The present invention is designed to effectively reduce shopping cart, lead and registration abandonment. The present invention has to be capable of up-selling and cross-selling as well, while providing the customer with a satisfactory experience. The present invention is customer friendly and provides real-time campaign management and reporting for publishers. Powered by a self-learning artificial intelligence engine, the present invention assists publishers in increasing their revenue opportunities. The present invention has been successfully deployed and continually enhanced and improved to meet the changes and needs of a growing market.

The present invention recovers many users that abandon websites or web registration process. The chatbot assists with the return of a user to the website or redirection to a third-party website for cross-selling or up-selling. An example would be: sell PC but direct to third-party warranty company for the purpose of closing the sale, to cross sell, up-sell, or build customer relationship.

The present invention provides web retailers with tight control of the artificial intelligence (AI) programming with fast setup to meet the demands of fast moving, easy to turn off and short-lived sales campaign. This is especially important to meet sales campaigns, sales promotions, regional customer demands and seasonal purchases.

Further, the term "campaign" is used to denote a web retailer's campaign during a specific period for a specific area of the web retailer's site. It is important to note that a campaign can be a global campaign, i.e. across multiple web retailers, a target campaign and a default campaign. If a web retailer has only one campaign, by definition it is the default campaign. Further, a "target campaign" can change frequently and be directed to only certain products and services offered through the web retailer's site.

Overall System

Turning now to FIG. 1 is a diagram of the overall system 100 for managing deployment and reporting behavior of chatbots. FIG. 1 shows one or more users or client systems 102, 104, and 106 communicatively coupled over a communications infrastructure 110 to one or more web servers hosting websites 122, 124, and 126. A user system can include a wireless device (e.g., a cellular telephone, a mobile phone, a smartphone and other wireless communication devices such as tablet computers), a laptop/computer, a desktop computer, and other information processing systems.

TeamSalesAgent server(s) 130 is also communicatively coupled to the communications infrastructure 110. The TeamSalesAgent server(s) 130 can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. Although the exemplary embodiments of the present invention are described in the context of a fully functional computer system, those skilled in the art will appreciate that embodiments are capable of being distributed as a program product via CD or DVD, e.g. CD 132, or other form of recordable media, or via any type of electronic transmission mechanism.

Chatbot Chat Window

Figure 2:
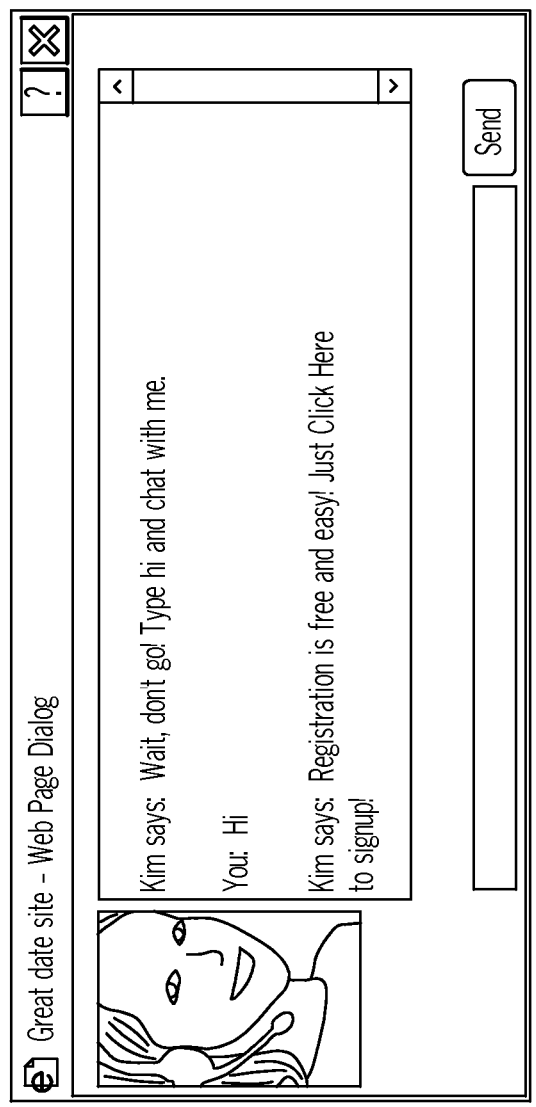
FIG. 2 is an example chatbot on a client system, according to the present invention.

FIG. 2 is an example chatbot chat window on a client system, according to the present invention. The chatbot runs on the client device 102, 104, and 106 typically after a predefined event. An event is either failure to complete a given process or some other predefined condition. Failed tasks include web site registration, lead form and shopping cart abandonment. A predefined event can also include a completed task such as shopping cart checkout, where the chatbot is used to cross-sell other services, such as warranty services. As shown in FIG. 2, in one example the chat window is a messaging window.

When information regarding a specific user is known, the chatbot in one example is customized dynamically to the specific user. For example, specific information about the end-user includes demographic information, such as, the end-user's address and/or zip code and/or age and/or gender and/or race. Information about the end-user can be derived through a variety of sources such as previous registrations with the retailer's site, the end-user's IP address, previous interactions with the chatbot or through other sources. This feature enables highly customizable chatbots specifically tailored to the specific user. Moreover, in another embodiment, not only is the "look and feel" of the chatbot customized to a specific user, but the greetings, the sales pitch and/or the replies are also customized to a specific user.

The picture of the agent, in this example with the name Kim, or chatbot is shown along with a dialog box between Kim and a user (Web retailer). It is important to note that the layout of the chat window is not limited to the window shown and many configurations are contemplated within the true scope and spirit of the present invention. In one example, the skin or "look and feel" of the layout of standard and customizable user interface components and any accompanying graphics of the chatbot chat window can be customized. For example, retailer-A may want a certain color scheme and graphics to match their own corporate branding, while retailer-B may want another color scheme and graphics to match their own corporate branding. These skin definitions are settable using the TSA management console described in more detail below. Furthermore, these skin definitions can be rotated just as the picture of the chatbot.

Chatbot Flow

Figure 3:
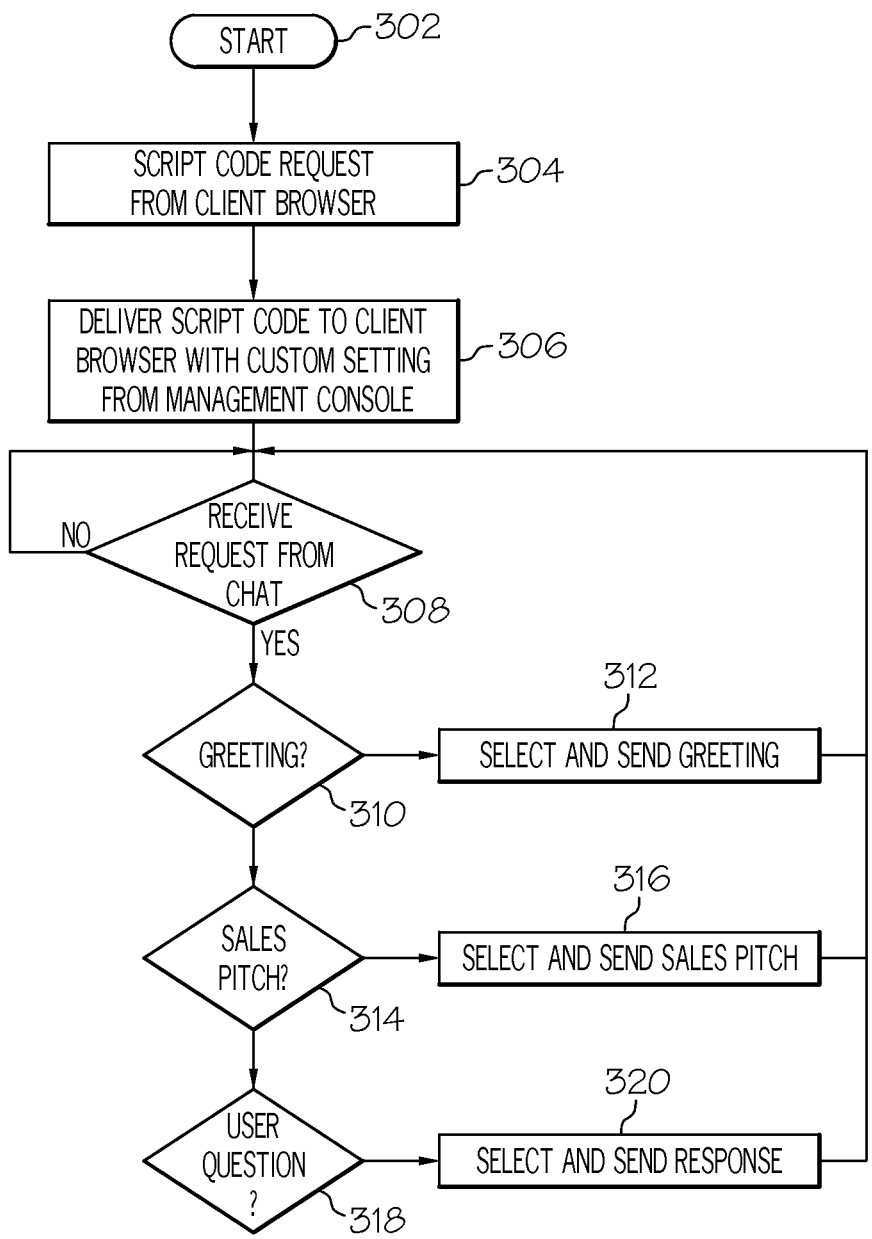
FIG. 3 is an example chatbot chat window flow from a TSA server perspective, according to the present invention.

FIG. 3 is an example chatbot chat window flow from a TSA server perspective, according to the present invention. This process runs when TSA chatbox window is loaded and the script request is from user on a client computer browsing a web retailer's web site. Examples of scripts used to integrate into a web retailer's website are illustrated at the end of this patent. The script code is sent along with various settings from the web-based management console in step 306. Various parameters or user selectable components are set through the TSA management console for the script settings. The script settings can include pitch delay, "agent is typing" message, typing times, and reading timer. These are discussed further below.

In one example, some of these settings are static, e.g. the various settable timers, reading timers, typing timers, are the same for all chat sessions. Other examples of settings are dynamic, e.g. agent photo, agent name, agent picture position on screen, campaign ID, timers, and greetings, sent only for when the particular chat session is initiated. In another example, the setting can be changed depending on information received from web retailer's site, such as demographic information or even personal information such as name of chat user. Further information such as a name of the chatbot, a persona presented (personality such as youthful, mid-western, age, and educational level) to a user, and a national language of the chatbot.

The process loop waits for a request from the chat in step 308. Once a request is received from chat 308, the process continues with determining the type of response, e.g. is it a greeting 310, then select and output greeting 312 based on preferences setup in TSA management console. Likewise, if the request is a sales pitch request, e.g. is it a sales pitch 314 then select and output sales pitch 316 based on preferences setup in TSA management console. Alternatively, if the request is a user question request, e.g. is it a user question 318, then select and output response 320 based on preferences setup in TSA management console. A more detailed explanation of the response selection process is discussed in FIG. 6 below.

Figure 4:
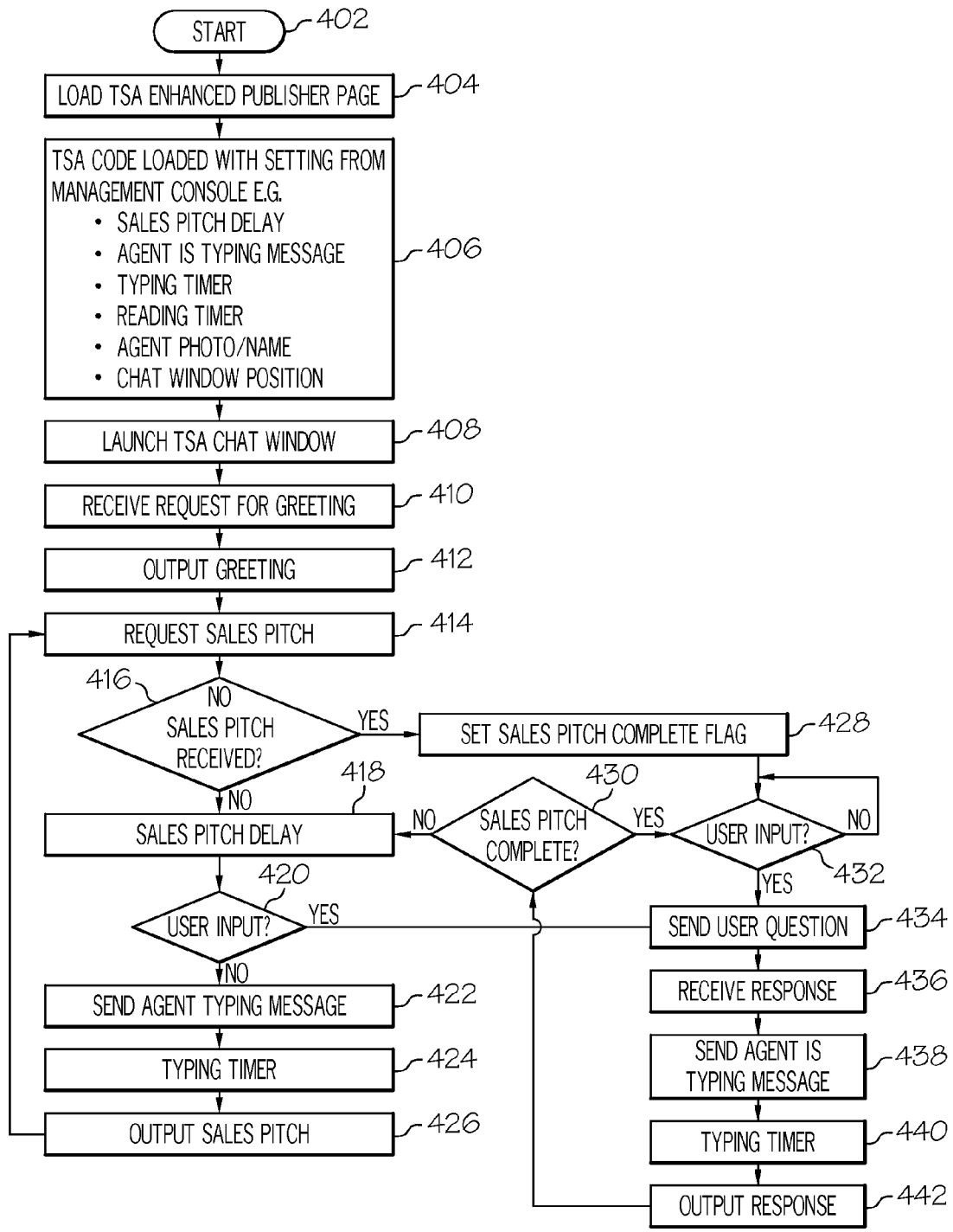
FIG. 4 is an example chatbot chat window flow from a TSA client perspective, according to the present invention.

FIG. 4 is an example chatbot chat window flow from a TSA client perspective, according to the present invention. The process begins at setup 402 and immediately proceeds to step 404 where the web retailer page with code for launching the chatbot is loaded. Examples of the code embedded in the web retailer page are shown at the end of this patent.

In step 406, the setting from the TSA management console are loaded such as, but not limited to, sales pitch delay, agent is typing message, typing timer, reading timer, agent photo/name, and chat window position.

The chatbot runs on the client device 102, 104, and 106 typically after a predefined event. The TSA window can load on various events such as the end-user leaving a web page, an abandoned shopping cart, a webpage domain change, or other link selected. It should be understood the TSA window can launch on other events such as no input from the end-user for a predetermined amount of time. In one example, an inactivity timer is used to trigger the predefined event. This inactivity timer is set in the TSA Management console along with other times. Still, in another example, if the web page or primary applet is minimized, this is used to launch the chatbot. Still further, one or more cursor positions can be used to trigger when launching the chatbot such as the minimize cursor position, close cursor position, URL cursor position, help cursor position, hover for a period of time, and more. Accordingly, a decision is made whether or not to launch the chatbot chat window based on one or more even/response pair triggers. This decision to launch is made while the end-user is interacting with the web retailer's page or while interacting with a specific applet.

Once the chatbot chat window is loaded in step 408 as shown in FIG. 2, the Greeting Request is received 410 from the chat window and TSA server 130 produces the Output Greeting 412 to the chatbot chat window. Next, a sales pitch is requested 414 and a response received from the TSA server 130. The system uses the greeting and sales pitch, collectively known as a events to sell, cross-sell or up-sell a product. The timing and when the sales pitch is displayed depends on whether a user of the chatbot chat window enters a question. The sales pitch can be a single entry or multiple entries to construct overall sales pitch. To begin, a test is made to determine in step 416 if a No Sales Pitch was received. If a No Sales Pitch was received (i.e. because either the sales pitch is complete or the web retailer is not using a sales pitch) the flow continues to step 428 and sets the Sales Pitch Complete Flag. In response to a sales pitch received in step 416 (i.e. the test in step 416 results in "no"); the sales pitch delay timer is started in step 418. When the timer expires, a test is made for user input 420. If there is user input received, in step 420, the flow continues to step 434. In response to no user input received, then in step 422 an "Agent is Typing" message is posted on the chat window (not shown) on FIG. 2. The "Agent is Typing" message is sent to notify the chat window user that a message is being formulated. This message is used to make the chatbot appear human rather than automated. Because a human typically will take time to read and type a response unlike a computer which is only limited by bandwidth and processing power, a delay "Typing Timer" 424 is set by configuration settings in the TSA management console. The sales pitch received as determined by the TSA management console settings is then printed in the chatbot chat window 426 and the process flows back to request another sales pitch 414 and then tests for another sales pitch or No Sales Pitch response 416.

In response to sales pitch was complete being completed, i.e. No Sales Pitch 416, the Sales Pitch Complete Flag 428 is set and a process loops on whether user input is received 432. Once a user question is received, it is sent to TSA server 103 and a response is received 436. To avoid the appearance of being too fast responding to a user question, a message on the chat box chat window "agent is typing" is displayed in step 438 and typing timer is set in step 440 before presenting the response 442 to the end-user. In the event the sales pitch was completed in step 430, the process loops in step 432 waiting for user input. Otherwise, the sales pitch process is continued in step 418.

Figure 5:
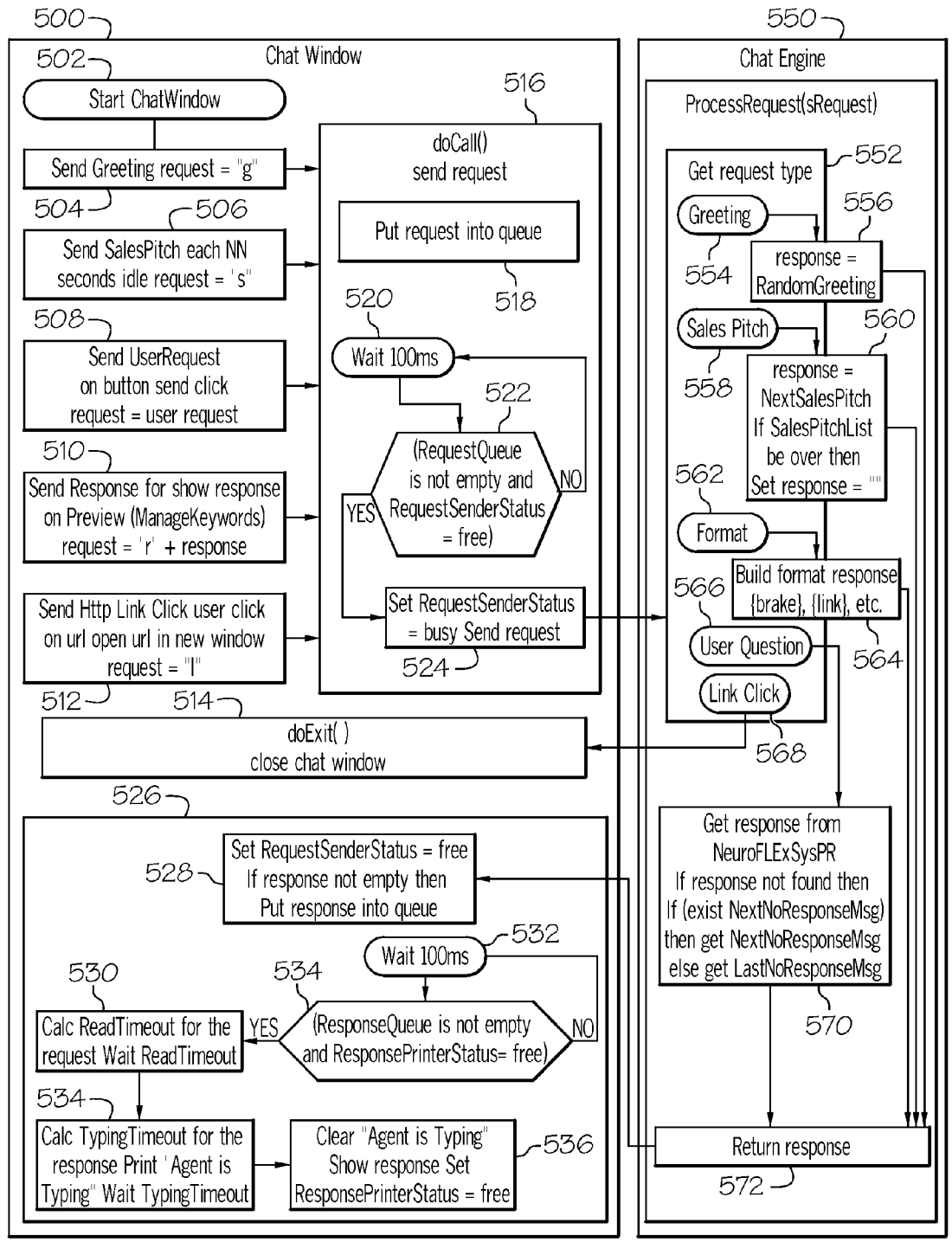
FIG. 5 is an example over-all flow from the TSA client-server perspective illustrating the interactions between the flows of FIG. 3 and FIG. 4, according to the present invention.

FIG. 5 is an example overall flow from the TSA client-server perspective illustrating the interactions between the flows of FIG. 3 and FIG. 4, according to the present invention. The chat window flow 500 begins with the chat window starting as described in FIG. 3 and example scripts discussed at the end of this patent. Boxes 504 "Send Greeting", 506 "Send Sales Pitch", 508 "Send user Request", 510 "Send Response", and 512 "Send HTTP Link" are various requests automatically made by the client 102, 104, and 106 to the TSA Server 130. The various requests 504, 506, 508, 510, and 512 as shown each go into a "Do Call Method" 516. The "Do Call Method" helps make the various calls synchronize with the Chat Engine 550 sitting on TSA server 130. The "Do Call Method" 516 includes a queue 518, Wait Time 520 by a predetermined number of seconds. The predetermined number of seconds is settable through the TSA management console and it should be understood that the 100 ms is an example only. The flags of Request Queue and the Request Sender Status 522 are used to determine whether the request is sent in 524 or the process loops back to Wait Time 520. This waiting and loop allow the "Do Call Method" 516 to synchronize if the request queue is "Empty" and the request sender status is "Free" so the message is sent out.

Chat engine 550 sitting on TSA server 130 receives request from the chat window 500 and finds answers to each request to send to the chat window 500. The process begins with Get Request Type 552 for passing the various requests to different sub-handlers depending on the type of the request. A response 572 is provided. There are two types of Request Types. A first type of request type is handled through the Engine 570 using artificial intelligence and/or neural networks. A second type of request type is handled by parameters, settings and responses for a campaign setup using the TSA management console. The sub-handlers include a sub-handler for "Greetings" 554, which tests whether the "Response=Random Greeting" is set by the TSA management console. The sub-handler "Sales Pitch" 558 and whether Reponse=MySite" is set by the TSA management console for a given campaign. The sub-handler "Format" 562 helps arrange and convert the answer to a request that is received from the chat window 500 based upon setting from the TSA management console. The sub-handler "Request" or "User Question" 566 handles general questions from a user typing in the Chat Window 500. The sub-handler "User Question" 566 uses the Engine 570 to find a response.

The Engine 570 in one example is a neural network engine. One example of an engine that has been shown to work advantageously with the present invention is disclosed in U.S. Pat. No. 7,529,722, with inventor Gene I. KOFMAN et al., filed on Dec. 22, 2004 entitled "AUTOMATIC CREATION OF NEURO-FUZZY EXPERT SYSTEM FROM ONLINE ANALYTICAL PROCESSING (OLAP) TOOLS", the teachings of which is hereby incorporated by reference in its entirety. The engine bases its responses on the probability of matches to a user question using NeuroFLexSysPR. For error checking purposes if no response is found to a question, a no response is selected.

The response is sent from the Chat Engine 550 to Chat Window 500 and the method 526 handles the presentation of the response to the end-user. It may delay the response depending on TSA management console in loop 532 and 534. There are several timers set at the management console such as "agent typing timer", "delay agent timer" and other timers to make the chat bot appear human. The "agent is typing" message 534 is used to notify the end-user that a response to their questions is being formulated and composed. This "agent is typing" message is cleared when the response is complete.

Figure 6:
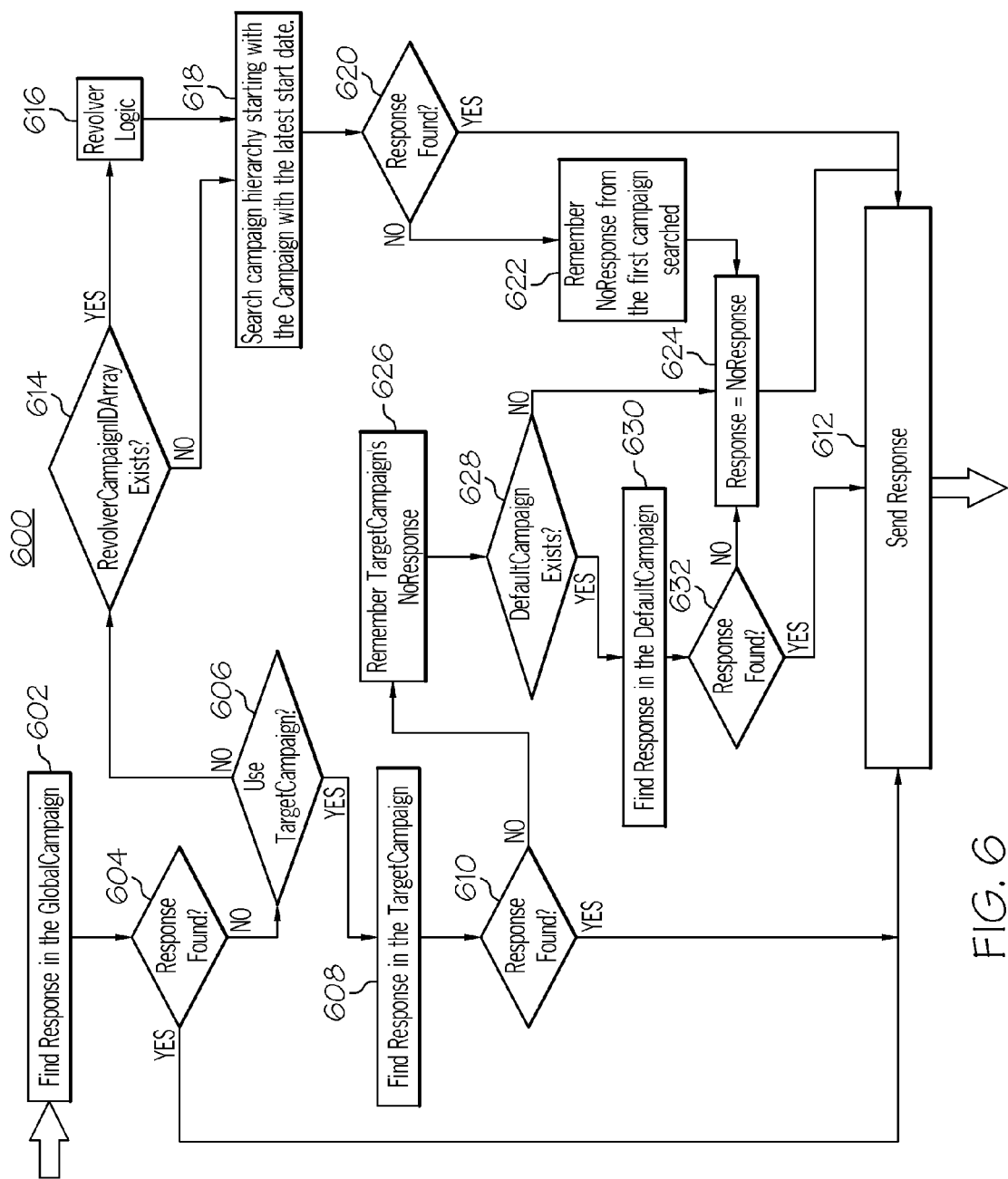
FIG. 6 is a more detailed flow of block 320 in FIG. 3 illustrating how the TSA server selects responses, according to the present invention.

FIG. 6 is an example overall flow diagram of how TSA server 130 selects a response in Chat Engine 570, according to the present invention. Again it is important to note that various parameters are set through the TSA management console by the web retailer such as campaign selection, decision method, keyword/response pairs, greetings, sales pitch, and a no response message. These are discussed further below.

The process begins at step 602 where responses to Global Campaigns are searched in order to identify user's questions that are to be handled the same, no matter the web retailer's campaign. Next in step 604, if a response is found the response is sent in step 612. However, if a response is not found, a test is made to determine if this is part of a target campaign in step 606. If it is part of a target campaign setup by a web retailer to handle a special product line or situation, the response for the target campaign is searched in step 608 and if a response is found in step 610, the response is sent in step 612. If a response is not found to a web retailer's target campaign the process continues to look at target campaign's no response settings previously set up through the TSA management console and save it, in step 626, for future use. If a default campaign exists, step 628, the default campaign, is searched in step 630 and, if the response is found in step 632 the response is sent in step 612. However if no response is found in step 632 or if a default campaign is not set up in step 628, the previously saved no response from step 626 is sent in step 612. The no response found setting in one example causes the chatbot to ask a clarifying question such as "please rephrase your question."

In the case where the target campaign is not used in step 606, the process flows direct to search the hierarchy in step 618 as shown. An example of a hierarchy of campaigns is a retailer site having a holiday special, then there is holiday terminology in the sales pitch or greeting or both, such as "Happy Holidays" or "We are running a special for Christmas!". There may also be a winter campaign and a default campaign. Each campaign may offer, for example different discounts, different delivery options and more. A target campaign is said to have precedence depending on when it is active. In this case, the campaign may take precedence from November 1st through December 24th. This precedence-in-time creates a hierarchy. If the holiday special campaign would answer any questions first from a user and if no answer is found, the system looks to other campaigns including the default campaign. This date-based hierarchy searches campaigns based on each campaign's start date; the campaign with the earliest start date is searched first. In the event a response is found in step 620, this is sent in step 612. However, in the event that no response is found, in step 620, the "no response" from the first campaign is set and a no response set in step 624 is sent in send response step 612. Although a date precedence hierarchy has been shown, other hierarchies such as sequence numbers have been shown to work advantageously within the true scope and spirit of the present invention.

Overview Internet Advertising

Figure 7:
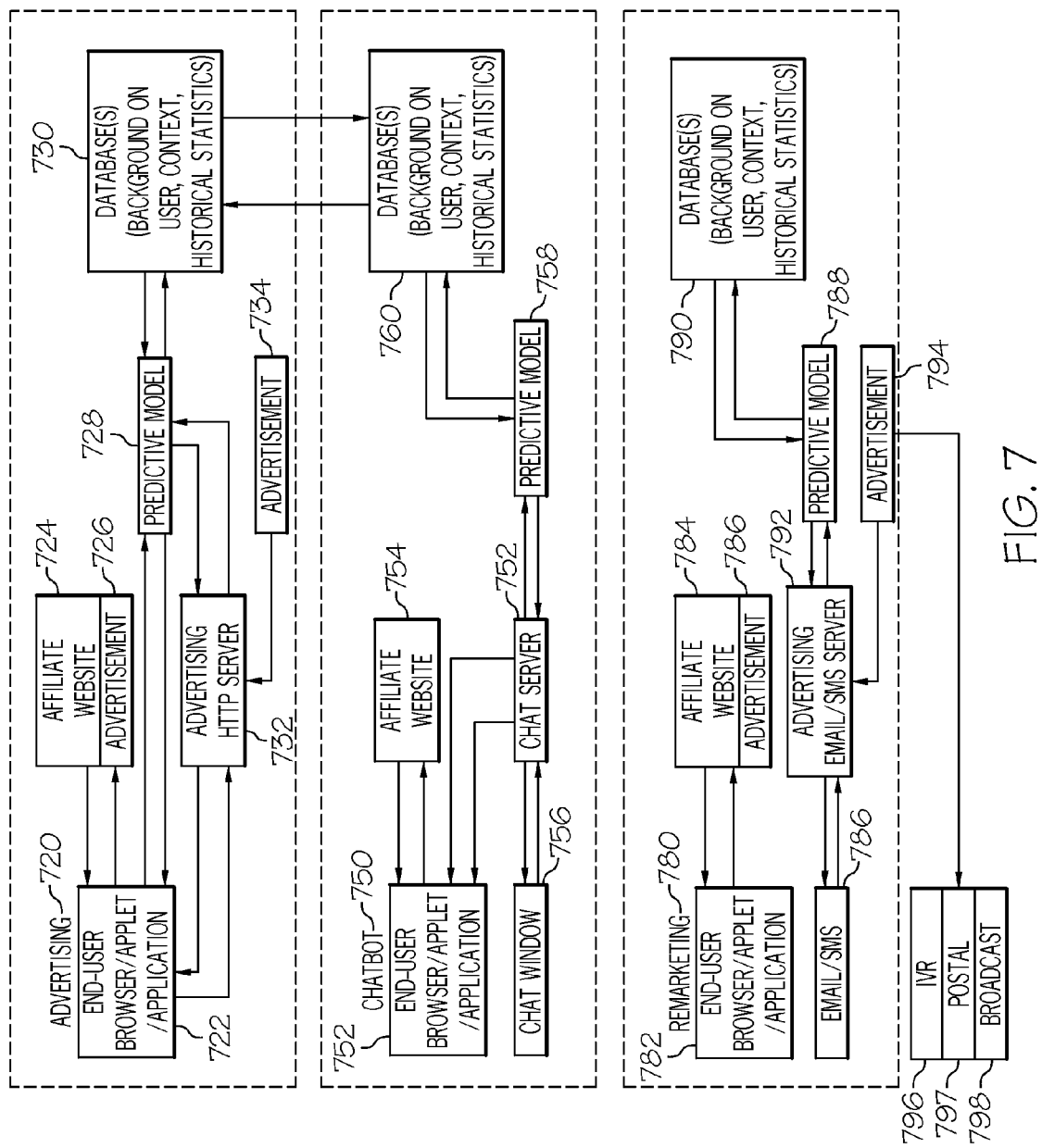
FIG. 7 is a block diagram of three internet-based advertising systems: i) an advertising system, ii) a chatbot system, and iii) a remarketing system.
Figure 9:
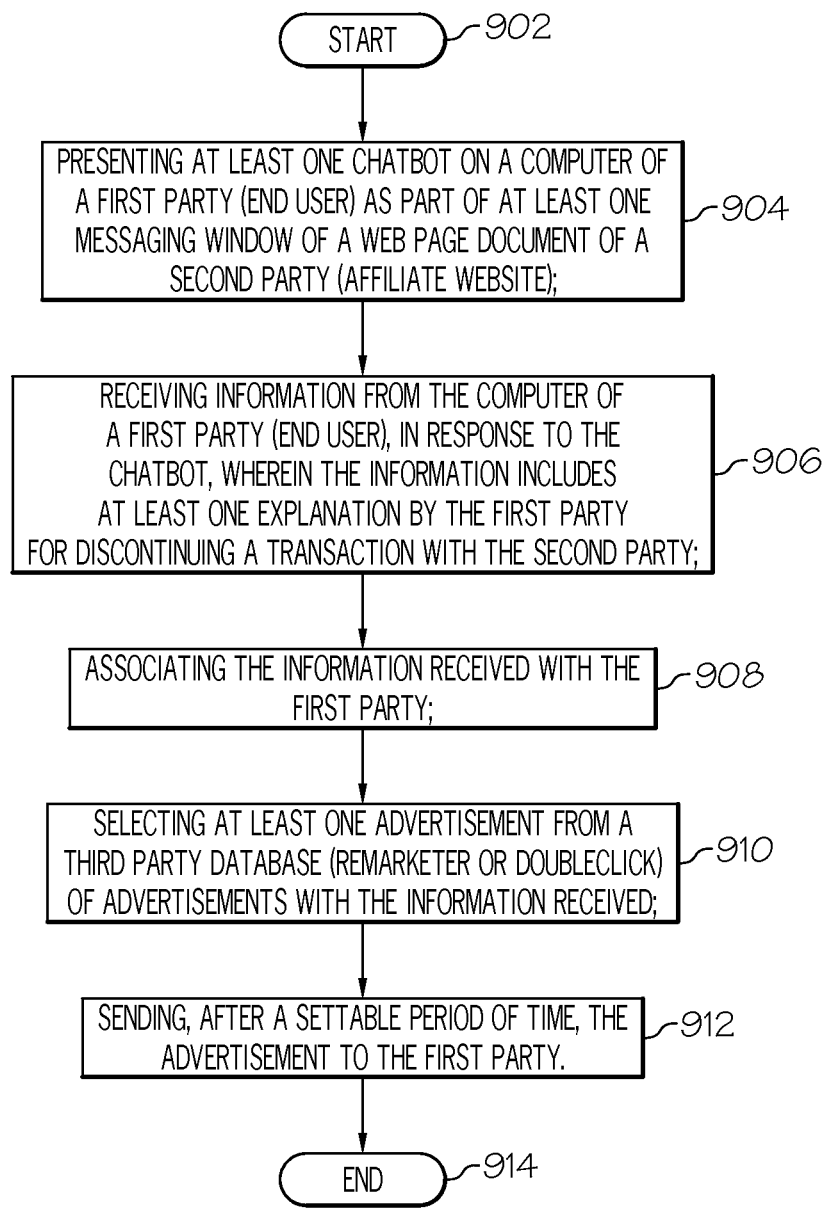
FIG. 9 is a high level flow of using information from the chatbot system.

FIG. 7 is a block diagram of three internet based advertising systems: i) an advertising system 720, ii) a chatbot system 750, and iii) a remarketing system 780. Each of these three advertising systems will now be discussed in-turn.

Advertising System 720

Starting with advertising system 720, an end-user using a web browser or other applet or application 722 on a computer, such as a smart phone, a laptop or tablet computer, begins by requesting an affiliate website 724. In one example, the affiliate website 724 is a website, such as a content provider with advertising space 726. An advertising server 732 which includes the predictive model 728 coupled to one or more context database(s) 730. The advertising server 732 includes a group of "offers" or direct advertisement in an advertisement database 734.

In operation, when an end-user, browsing on the Internet, accesses an affiliate's web site 724 which would typically include media content and advertising space 726, the end-user's browser 722 generates an http message to get the information for the desired Web page. The affiliate's web site 724 in response transmits one or more messages back containing the information to be displayed by the end-user's browser 722. In addition, the advertising server 732, using a local database 734 containing advertising and user data, provides additional information comprising one or more objects, such as a banner advertisement, to be displayed in the advertising space 726 along with the information content provided from the affiliate web site 724. Upon clicking through by selecting the advertising space 726, such as a banner advertisement, the browser 722 is connected to the direct advertiser's web site (not shown) i.e. a third-party website.

The basic operation of the advertisement system 720 provides for the selection of advertising targeted to the end-user on an affiliate website 724. The predictive model 728 processes all of the informational context in the database 730 and selects a single direct advertisement from a database of available advertisements 734, or a ranked order of direct advertisements to advertising server 732, to which the end-user is most likely to respond.

The direct advertisement that is selected is dynamically delivered through to the end-user for him or her to view through a web browser 722 to advertising space 726. The end-user may then interact with the direct advertisement. The end-user may respond to an interactive button on the advertisement, an Internet forms or lead-form, a fax-back systems, a toll-free number, a direct mail postcard. This interaction with the direct response advertisement(s) are used as explicit feedback and this context is updated in database 730. Feedback is transmitted back to the predictive model 728 directly from the end-user web browser 720 or through a proxy server, such as, the advertising server 732. For example, filling out a form, placing an order, supplying a credit card number, completing a survey, providing a survey or lead form, executing a software download, etc. are all forms of transactions. This feedback may include detailed information about a particular end-user's response to a direct advertisement, as well as the context, under which the response was obtained. Alternatively, the feedback may include a subset of the preceding information. Or, the feedback may convey information that the end-user did not respond to the advertisement, if such was the case. The feedback information is used by the predictive model 728 to further refine future predictions about the optimal advertisements to deliver and maximize utilization of the advertising space 726.

Transaction results of the direct advertisement placement are reported back to the predictive model 728. In one example, the direct advertiser's server 732 reports transactions back to the advertising server by a proxy (not shown) server. In another example, email reporting is used.

The history of website visits and browsing history may also be used to deliver relevant messaging. For example, if a given user has visited a baby products site, and a prepaid college site, the reports back the advertising server indicates an the user is interested in information related to babies.

Chatbot System 750

Many of the functional details of chatbot system 750 are described in FIGS. 1-6 above. FIG. 7 is a high level comparison of chatbot system 750 as compared to the advertising system 720 and remarketing system 780. An end-user using a web browser or other applet or application 752 on a computer, such as a smart phone, a laptop or tablet computer, begins by requesting an affiliate website 754. A chatbot server 752, includes the predictive model 758 coupled to one or more context database(s) 760. The chatbot server 752 includes a chat engine 550 described above in FIG. 5 that responds to questions sent by end-users via chat window chatbot 756.

In operation, when an end-user, browsing on the Internet, accesses an affiliate's web site 724 which would typically include media content, triggers the chatbot 756 to launch. Launching of the chat window can be triggered by a variety of activities including no activity from the end-user within a settable period of time, leaving a web page, selecting specific links on a web page; a change in domain; abandoning a shopping cart; minimizing a web page; inactivity timer expiring; selection of click to chat button; and cursor position on the web page, or a combination of these. Once the chat window is launched, the chat engine 550 performs as described above in FIGS. 1-6. The chat engine in chat server 752 using a predictive model 758 processes the informational context in the database 760 and selects a single direct response from a database of available responses 760 to the end-user. In one example, initial greetings and the sales pitch may each be individually tailored to a specific user. For example, based on previous history on a particular affiliate website, questions about discounts and shipping may be common. Using this information the initial sales pitch for the affiliate website may be tailored to predict this question "Today Only—10% off coupon and Next Day". This sales pitch would be presented even before the end-user asks a question.

Information from the end-user through chat window 756 including questions, responses and reasons including "why" a transaction is being discontinued by the end-user are stored in database 760. This reason provides important additional information to the end-user's behavior. This interaction with the direct response from the end-user via chat window 756 is used as explicit feedback and this context is updated in database 760. For example, filling out a form, placing an order, supplying a credit card number, completing a survey, providing a survey or lead form, executing a software download, etc. are all forms of transactions. This feedback may include detailed information about a particular end-user's response to a direct advertisement, as well as the context under which the response was obtained. Alternatively, the feedback may include a subset of the preceding information. Or, the feedback may convey information that the end-user did not respond to the advertisement, if such was the case. The feedback information is used by the predictive model 758 to further refine future predictions about the optimal responses or offers to deliver from the chat server 752 to the end-user through chat window 756.

ReMarketing System 780

FIG. 7 is a high level comparison of remarketing system 780 as compared to the advertising system 720 and chatbot system 750. As with both the advertising system 720 and chatbot system 750, an end-user uses a web browser or other applet or application 782 on a computer and begins by requesting an affiliate website 784. An advertising server 792, such as an email server and/or short-message-service server is typically used. The advertising server 792 includes the predictive model 788 coupled to one or more context database(s) 790. The advertising server 792 includes a group of "offers" or direct advertisement in an advertisement database 794.

In operation, when an end-user, browsing on the Internet, accesses an affiliate's web site 784 which would typically include media content and advertising space 786, the end-user's browser 782 generates an http message to get the information for the desired Web page. The affiliate's web site 784, in response, transmits one or more messages back containing the information to be displayed by the end-user's browser 782. In addition, the advertising server 792, using a local database 794 containing advertising and user data, provides additional information comprising one or more objects, such as a banner advertisement. Upon clicking through by selecting the advertising space 786, such as a banner advertisement, the browser 782 is connected to the direct advertiser's web site (not shown) i.e. a third-party website.

The basic operation of the advertisement system 780 provides for the selection of email or text advertising targeted to the end-user. The predictive model 788 processes all of the informational context in the database 790 and selects a single direct advertisement from a database of available advertisements 784, or a ranked order of direct advertisements to advertising server 792, to which the end-user is most likely to respond.

The direct advertisement that is selected is dynamically delivered through to the end-user for him or her to view through email and/or text messaging. The end-user may then interact with the direct advertisement. The end-user may respond to an interactive button on the advertisement, an Internet forms or lead-form, a fax-back systems, a toll-free number, a direct mail postcard. This interaction with the direct response advertisement(s) are used as explicit feedback and this context is updated in database 790. Feedback is transmitted back to the predictive model 788 directly from the end-user through email, text or SMS messaging, a web browser 782 or through a proxy server, such as, the advertising server 732. For example, filling out a form, placing an order, supplying a credit card number, completing a survey, providing a survey or lead form, executing a software download, etc. are all forms of transactions. This feedback may include detailed information about a particular end-user's response to a direct advertisement, as well as the context, under which the response was obtained. Alternatively, the feedback may include a subset of the preceding information. Or, the feedback may convey information that the end-user did not respond to the advertisement, if such was the case. The feedback information is used by the predictive model 788 to further refine future predictions about the optimal advertisements to deliver and maximize utilization of the email or text messaging.

Using Feedback from Chatbot System 780

As the inventors have discovered, the chatBot system 750, unlike the advertising system 720 and the remarketing system 780, routinely receives insights to end-user behavior including reasons "why" a transaction is being discontinued by the end-user. These insights and other information are stored in database 760. In one example, this valuable reasoning is shared with either the advertising system 720 and the remarketing system 780 or both. For example, an end user is looking to purchase a good and while interacting with the chat server 752, the end-user shares that reason why they are discontinuing a transaction. The chat server 752 associates this information with the end-user. It is important to note that although a good is being described, the following example is applicable to the purchase of a service as well. The reason in this example is because one or more of:

shipping the selected good is too expensive.

shipping is not available to a shipping address provided by the prospective customer.

the available selection of the good is limited e.g. not correct sizes, color, quality.

financing is necessary to complete a purchase of the good.

Inability to pay with a specific instrument. For example the web site may only accept Visa and Mastercard, users wants to pay with AMEX or with a check or through PayPal.

inadequate security of the web page of the affiliate website, e.g. the merchant is unknown to the end-user or the user is on a public computer.

an inconvenient time to complete the transaction, e.g. end-user is catching a plane, getting into a cab, is currently at work.

an inconvenient location of the computer of the end-user e.g. the computer is in an office or is a public computer such as a library.

Selected good or service is perceived to be too expensive.

User may feel that he or she does not qualify for the offer. For example, the user may believe they are ineligible for a loan because of poor credit.

This information stored in database 760 is shared with an advertising system. Next time an advertisement is selected by the predictive model, it has a reason why the end-user as associated by the chat server 752 failed to complete a transaction and using this additional information to select the appropriate promotion or advertisement. For example, "Free-Shipping on all orders placed before mid-night" or "Check out our expanded collection of clothing for Big and Tall Men" or "Special financing and payment plans available today". The chat server 752 can reconcile associations with the advertising system 720 by placing a http cookie associated with the affiliate website for identification of an end user session, end-user's preferences, end-shopping cart contents, or anything else that can be accomplished through storing text data. In another example, the chat server 752 is given access to http cookies placed by either the advertising system 720 and/or the remarketing system 780 to associate information with a given end-user.

Sharing the end-user reasoning received by the chat server 752 to the advertising system 720 greatly enhances the quality of the promotion or advertisement sent by advertising system 720 to the end-user. For example, if a user is searching for computers a day or two ago and reviewed but did not purchase a computer, the predictive model will give higher priority to any advertisement from an available advertisement pool for computers to match the end-users interests.

In a similar manner, sharing the end-user reasoning received by the chat server 752 to the remarketing system 780 greatly enhances the quality of the promotion or advertisement sent by remarketing system 780 to the end-user. The advertisement can be real-time or delayed as described below. The advertisement can be delivered through the chat server 752, an email or text message 786, a voice mail message through an interactive voice system 796, a personalized print advertisement or postal advertisement 797 or a personalized broadcast advertisement through television and radio 798.

In one example, a temporal aspect to the advertisement is set by the advertising system 720 or remarketing system 780. End-user abandoning a shopping cart because selection is poor, may receive an advertisement only after the available selection of the goods/services from a given affiliate website has been expanded.

In another example, the present invention targets the abandon user for a complimentary products. For example the user buys a used car, the present invention could cross-sell an extended warranty.

FIG. 8 is an example record 800 populated by the chat server with information including reason for discontinuing a transaction. This information can be populated for a single user id through use of http cookies or other mechanisms. The record includes an affiliate website ID, a reason for discontinuing a transaction 804, one or more items 806, such as a good or service being reviewed by end user, a unique end user id 808 to allow tracking across multiple affiliate sites and web sessions. The record 800 includes a date field 810 and time field 812, uniform resource location (URL) 814 of website as well. Information in this record is shared from the chatbot system 750 with the advertising system 720 or the remarking system 780 or both.

High-Level Flow of Using Feedback from Chatbot System 780

The process begins in step 902 and immediately proceeds to step 904 in which at least one chatbot is presented on a computer of a first party, such as end-user, as part of at least one messaging window of a web page document of a second party, an affiliate website. Next in step 906, information is received from the computer of a first party, in response to the chatbot, wherein the information includes at least one explanation by the first party for discontinuing a transaction with the second party. The transaction in one example is a sales-related transaction for a purchase of at least one of a good and a service from the second party. The sale-related transaction can include a lead-form.

The information received is associated with the first party in step 908. At least one advertisement from a third-party database is selected with the information received. Third party marketing databases include databases from advertisers (such as, ADSENSE, ADBRITE, BIDVERTISER, CHITIKA, INFOLINKS, POCKET CENTS, KONTERA, CLICKSOR, EXIT JUNCTION, DYNAMIC OXYGEN, ADBULL) and remarketing databases (ICONTACT, BENCHMARK EMAIL, MAILIGEN, PINPOINTE, CONSTANT CONTACT, CAMPAIGNER, GRAPHICMAIL, MAD MIMI, VERTICAL RESPONSE, MAILCHIMP). In step 912, after a settable period of time, the advertisement is sent to the first party and the flow terminates in step 914.

Information Processing System

Figure 10:
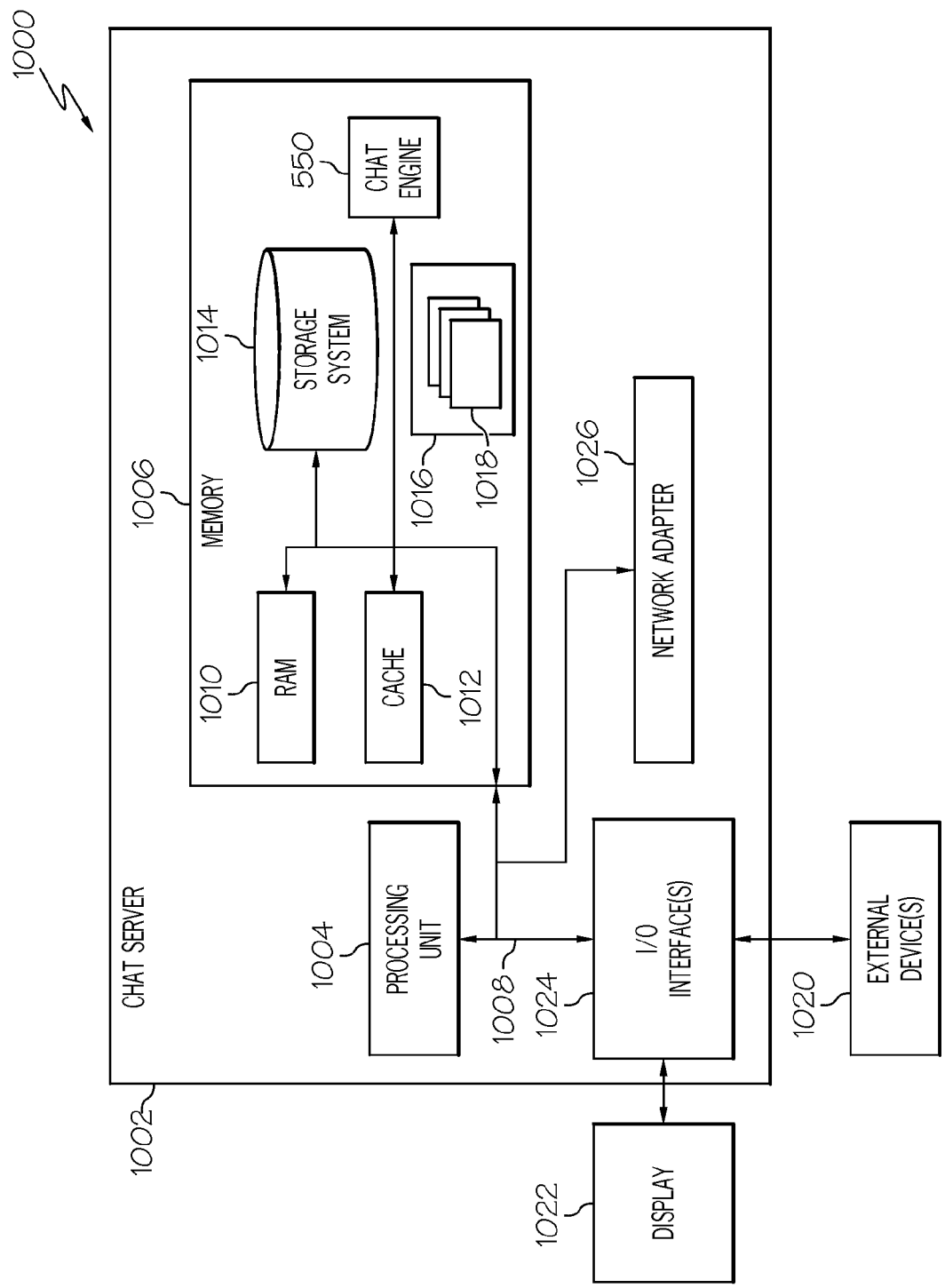
FIG. 10 is an example of an information processing system according to one embodiment of the present invention.

FIG. 10 is an example of an information processing system 1000 such as the chat server 752 of FIG. 7 with chat engine 550 of FIG. 5 as shown. In information processing system 1000 there is a computer system/server 1002, which is operational with numerous other general purpose or special purpose computing system environments or configurations. Examples of well-known computing systems, environments, and/or configurations that may be suitable for use with computer system/server 1002 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and the like.

Computer system/server 1002 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 10, computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

The system memory 1006 can include computer system readable media in the form of volatile memory, such as random access memory (RAM) 1010 and/or cache memory 1012. Computer system/server 1002 can further include other removable/non-removable, volatile/non-volatile computer system storage media. By way of example only, storage system 1014 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1016, having a set (at least one) of program modules 1018, may be stored in memory 1006 by way of example, and not limitation, as well as an operating system, one or more application programs, other program modules, and program data. Each of the operating systems, one or more application programs, other program modules, and program data or some combination thereof, may include an implementation of a networking environment. Program modules 1018 generally carry out the functions and/or methodologies of embodiments of the invention as described herein.

Computer system/server 1002 may also communicate with one or more external devices 1020 such as a keyboard, a pointing device, a display 1022, etc.; one or more devices that enable a user to interact with computer system/server 1002; and/or any devices (e.g., network card, modem, etc.) that enable computer system/server 1002 to communicate with one or more other computing devices. Such communication can occur via I/O interfaces 1024. Still yet, computer system/server 1002 can communicate with one or more networks such as a local area network (LAN), a general wide area network (WAN), and/or a public network (e.g., the Internet) via network adapter 1026. As depicted, network adapter 1026 communicates with the other components of computer system/server 1002 via bus 1008. It should be understood that although not shown, other hardware and/or software components could be used in conjunction with computer system/server 1002. Examples include, but are not limited to: microcode, device drivers, redundant processing units, external disk drive arrays, RAID systems, tape drives, and data archival storage systems, etc.

Non-Limiting Examples

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for advertising selection, the method comprising:
    presenting at least one chatbot on a system of a first party as part of at least one messaging window of a web page document of a second party, wherein the chatbot including at least one of initial greeting and a picture of an agent is customized to a specific user of the system based on at least one of a geographic location, age, and gender associated with the specific user;
    receiving information from the system of the first party, in response to the chatbot, wherein the information includes at least one explanation by the first party for discontinuing a transaction with the second party;
    associating the information received with the first party;
    selecting at least one advertisement from a third party an advertisement database of a third party with the information received, and wherein a web-based management console is hosted by the third party to manage the chatbot; and
    sending, after a settable period of time, the advertisement to the first party.

2. The method of claim 1, wherein the transaction with the second party includes a sales-related transaction for a purchase of at least one of a good and a service from the second party.

3. The method of claim 1, wherein the transaction with the second party includes at least one of a lead form for:
    insurance;
    mortgage;
    a loan;
    debt counseling;
    a credit card; and
    a pre-paid card.

4. The method of claim 1, further comprising:
    retrieving at least one http cookie from the computer of the first party, and wherein the selecting the at least one advertisement from the advertisement database of the third party includes using the http cookie.

5. The method of claim 1, further comprising:
    retrieving at least one http cookie placed by the third party from the computer of the first party, and wherein the selecting the at least one advertisement from the advertisement database of the third party includes using the http cookie.

6. The method of claim 1, wherein the sending, after the settable period of time, the advertisement to the first party using at least one of:
    the chatbot;
    a text message;
    an email message;
    a voice message;
    a banner advertisement;
    a print advertisement in print media;
    a broadcast advertisement; and
    a postal mail advertisement.

7. The method of claim 1, wherein the explanation includes shipping is too expensive.

8. The method of claim 1, wherein the explanation includes shipping is not available to a shipping address provided by the first party.

9. The method of claim 2, wherein the explanation includes a selection of the at least one of the good and the service offered by the second party is limited.

10. The method of claim 2, wherein the explanation includes financing is necessary to complete a purchase of the at least one of the good and the service offered by the second party.

11. The method of claim 1, wherein the explanation by the first party for discontinuing the transaction includes at least one of an inadequate security of the web page of the second party and the user is on a public computer.

12. The method of claim 1, wherein the explanation includes at least one of:
an inconvenient time, and
an inconvenient location of the computer of the first party to complete the transaction with the second party.

13. The method of claim 1, further comprising:
at least one trigger to launch the chatbot.

14. The method of claim 13, wherein the at least one trigger to launch the chatbot includes one or more of the following:
leaving the web page;
selecting specific links;
change in domain;
abandon shopping cart;
minimizing a web page;
inactivity timer expiring;
selection of click to chat button; and
cursor position on the web page.

15. A system for advertising selection, the system comprising:
a computer memory capable of storing machine instructions; and
a processor in communication with said computer memory, said processor configured to access the memory, the processor performing
presenting at least one chatbot on a system of a first party as part of at least one messaging window of a web page document of a second party, wherein the chatbot including at least one of initial greeting and a picture of an agent is customized to a specific user of the system based on at least one of a geographic location, age, and gender associated with the specific user;
receiving information from the system of the first party, in response to the chatbot, wherein the information includes at least one explanation by the first party for discontinuing a transaction with the second party;
associating the information received with the first party;
selecting at least one advertisement from an advertisement database of a third party with the information received, and wherein a web-based management console is hosted by the third party to manage the chatbot; and
sending, after a settable period of time, the advertisement to the first party.

16. The system of claim 15, wherein the transaction with the second party includes a sales-related transaction for a purchase of at least one of a good and a service from the second party.

17. The system of claim 15, wherein the transaction with the second party includes at least one of a lead form for:
insurance;
mortgage;
a loan;
debt counseling;
a credit card; and
a pre-paid card.

18. The system of claim 15, further comprising:
retrieving at least one http cookie from the computer of the first party, and wherein the selecting the at least one advertisement from the advertisement database of the third party includes using the http cookie.

19. A non-transitory computer program product tangibly embodying computer readable non-transitory instructions which, when implemented, cause a computer to carry out the steps of a method for advertising selection, comprising:
presenting at least one chatbot on a system of a first party as part of at least one messaging window of a web page document of a second party, wherein the chatbot including at least one of initial greeting and a picture of an agent is customized to a specific user of the system based on at least one of a geographic location, age, and gender associated with the specific user;
receiving information from the system of the first party, in response to the chatbot, wherein the information includes at least one explanation by the first party for discontinuing a transaction with the second party;
associating the information received with the first party;
selecting at least one advertisement from an advertisement database of a third party with the information received, and wherein a web-based management console is hosted by the third party to manage the chatbot; and
sending, after a settable period of time, the advertisement to the first party.

20. The computer program product of claim 19, wherein the transaction with the second party includes a sales-related transaction for a purchase of at least one of a good and a service from the second party.

* * * * *